ARRANGEMENT FOR COMBINING SUBTITLE INFORMATION AND VIDEO SIGNALS AT THE TELEVISION TRANSMITTER

Filed June 12, 1967

INVENTOR
CARL J. WICKLUND

BY Larson and Taylor
ATTORNEYS

United States Patent Office 3,532,806
Patented Oct. 6, 1970

3,532,806

ARRANGEMENT FOR COMBINING SUBTITLE INFORMATION AND VIDEO SIGNALS AT THE TELEVISION TRANSMITTER

Carl Johan Wicklund, Stockholm, Sweden, assignor to Sveriges Radio Aktiebolag, Stockholm, Sweden, a corporation of Sweden Filed June 12, 1967, Ser. No. 645,211
Claims priority, application Sweden, July 20, 1966, 9,907/66
Int. Cl. H04n *1/38, 5/38*
U.S. Cl. 178—5.8 9 Claims

ABSTRACT OF THE DISCLOSURE

An electrical circuit arrangement is provided for producing video signals incorporating sub-titles which appear on the screen as text on a contrasting background by mixing a picture video signal with a sub-title information signal. The arrangement counts the picture field lines corresponding to the duration of the sub-title information signal, and, responsive to the sub-title information signal, counts a predetermined number of field lines substantially corresponding to the number forming a single picture. A background band replaces the video signal for a time beginning at the end of the latter count and ending upon or shortly after the disappearance of the sub-title signal.

Figure 1:
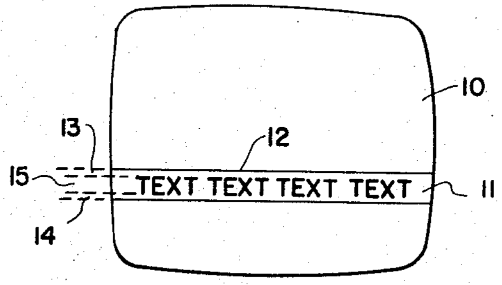

This invention relates to circuits adapted to produce video signals wherein the picture information includes sub-titles.

In television transmission it is often necessary to translate the audio information of a foreign production program into the national language by means of sub-titles appearing near the bottom of the receiver screen. Usually the text is not added directly to the original film to be reproduced. Instead the film per se is reproduced by means of a film scanner, and the next per se is reproduced by means of a dia-scanner or text reader. By a dia-scanner, in this connection, is meant a scanner for scanning a card, a sheet or the like, which may be non-transparent and is often made as a diapositive or a dianegative. The signals from the two scanners concerned are thereafter mixed together.

Hitherto sub-titles were presented as light printing directly on the picture on the assumption that the picture is sufficiently dark to provide contrast. This would of course work satisfactorily with a relatively dark background. Experience, however, shows that this is not always true, for the sub-titles often register with fairly light areas on the screen, and this renders the reading of sub-titles difficult if not impossible, and quite tiresome. In order to overcome this disadvantage, it has been proposed to provide a dark band on the picture, preferably horizontally disposed in the lower part of the screen, and to "print" the sub-titles within the limits of the band.

In such arrangements the operator is required to manually correct the position and the height of the background band to correspond to the text being broadcasted. Needless to say such adjustments, which must be carried out during transmission and as often as the lines of text change, are objectionable from both the point of view of quality of production and of efficiency at the transmitting station. A further significant shortcoming of this system is that where the text is read from printed cards and the printing thereon is at an angle, the upper and lower edges or corners of the sub-titles may be situated outside the background band.

The present invention is concerned with an arrangement for avoiding the above indicated disadvantages.

This can be achieved by using a circuit which automatically adjusts the vertical position and the height of the background band in such a way that the text is always within the limits thereof.

It is immaterial to the invention whether the background band extends entirely across the picture field in the horizontal direction, or partly thereof to correspond more or less with the length of each line of sub-title text. According to an especially advantageous embodiment of the invention, the arrangement is such that there is always a narrow strip of the background band above and below the highest and lowest points of the sub-titles. It is of course immaterial whether the background band is dark with light sub-title print or vice versa. This choice would be determined on the basis of practical considerations.

The invention also takes account of the possibility of having more than one line. Normally, however, television broadcasting sub-titles do not have more than two lines. The reason is that the sub-titles must be of a given minimum height, and that a reasonable distance must be provided between the lines. As a matter of fact, it is preferable to allow space between the background bands, when more than one line is necessary. Preferably this space corresponds to the height of a background band. Evidently, with such an arrangement, three black bands, receiving three lines of text are likely to cover too much of the picture.

This invention, threfore, provides circuit means for producing television video signals incorporating sub-titles adapted to appear on the screen of a receiver set as printing on a contrasting background band, wherein a picture video signal is mixed with a sub-title information signal; comprising:

(a) sub-title signal detector coupled with the input line bearing said sub-title information signal, and adapted to determine the picture field lines that correspond with the arrival and termination of said sub-title information signal, (b) counting means coupled with the output of said sub-title signal detector and triggered thereby immediately upon the arrival of a sub-title information signal to count a predetermined number of picture field lines corresponding substantially to the number of field lines that form a single picture, (c) a background band forming circuit operable upon counting of said predetermined number of lines to produce a background band forming signal replacing said video signal, (d) height means coupled with the output of said counting means and said sub-title detector, and adapted to start and stop operation of said background band forming circuit respectively upon termination of counting said predetermined number of picture field lines and upon, or shortly after, disappearance of said sub-title information signal.

Figure 2:
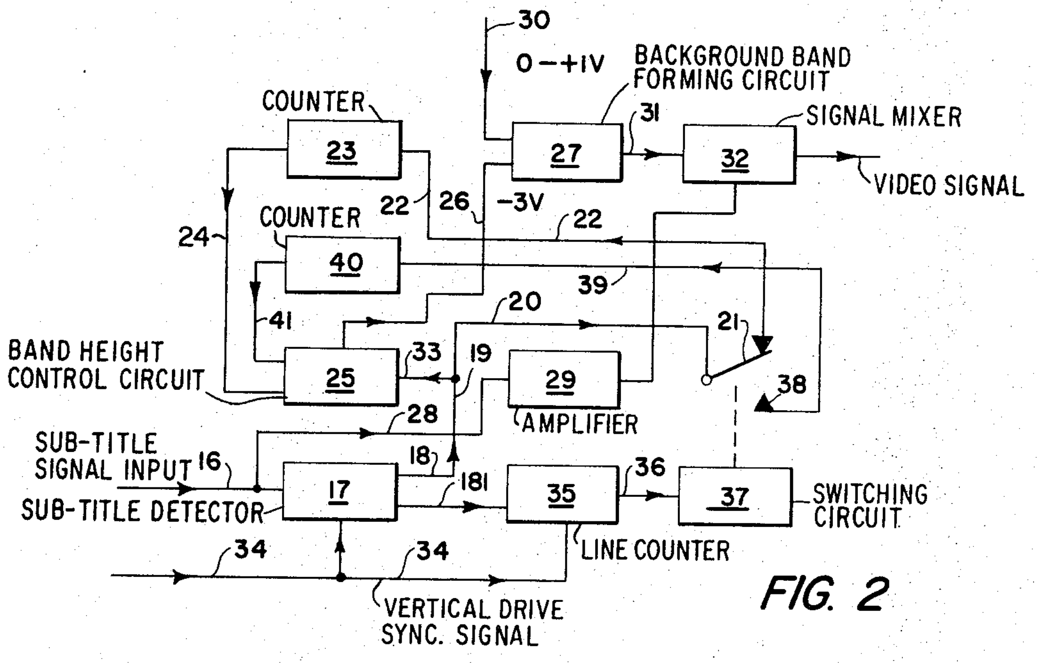

The invention will be further described below with reference to the accompanying drawings, in which: FIG. 1 represents a picture image of a television receiver with text in the form of a title provided on dark background band; and FIG. 2 is block circuit diagram of an arrangement according to the invention.

In the arrangement according to FIG. 1, the numeral 10 indicates the reproduced picture field, and in the lower part of picture 10 a dark background band 11 is used which provides contrast to the sub-title or text material. This text may contain a plurality of words in sequence, and, as an example, this, the expression "TEXT TEXT TEXT" has been chosen here. The simultaneously reproduced picture has not been shown in FIG. 1.

The invention is independent of the television system used, and especially it is independent of the number of lines. The invention will be described below in connection with a television system, containing 625 lines, measured in vertical direction, but it is obvious that the invention is not limited in this respect or with respect to any other details of this type and that many modifications may be made within the scope of the invention. For example, television systems may use different numbers of lines, the text may have a different width, and the dark space existing above the uppermost point or below the lowermost point of the text may be of different width and so on.

In FIG. 1 the height of the letters is indicated by 15, whereas the coherent dark band above the uppermost point of the letters is indicated by 13 and the coherent dark band below the lowermost point is indicated by 14. The total height of the dark background band will, therefore, be the sum of these heights, indicated by 13, 14, and 15.

In FIG. 2 a circuit in accordance with this invention is shown diagrammatically. Line 16 is the output of the sub-title reader (not shown) and the sub-title signals are fed to an amplifier 29 then to a circuit 32 which mixes the picture video input of line 30 with the sub-title information. Line 16 is also coupled with a sub-title detector 17 which determines the picture field lines that correspond with the arrival and termination of the signal on line 16. Specifically upon the occurrence of a sub-title signal, detector 17 produces a pulse which is applied to counter 23 via line 18, contact 21 and line 22. The function of contact switch 37, 21, 38 will be explained hereinafter. Counter 23 which may be a digital counter is adapted to count the number of lines that exist between the top edge of the sub-title text on any given simple picture frame and the top edge of the background band on the next simple picture frame and then to release a triggering pulse via line 24 and circuit 25 to be applied to background band forming circuit 27. In other words counter 23 must be adjusted for producing a signal exactly X sweep lines after receipt of a start signal from detector 17, the number X corresponding to the number of sweep lines in a simple picture less the number of lines in distance 13 as shown in FIG. 1.

As an example, it may be assumed that the total number of lines is 625, and that, thus, one single picture contains 312.5 lines, and that the width of the strip 13 in FIG. 1 represents two and three lines alternatively. In this case, the digital counter will count 310 lines.

Hence once counter 23 is started the sweeping beam will move from the upper edge of the sub-title text, that is the limitation line between the two partial bands 13 and 15 in FIG. 1, to the lower edge of the simple picture frame, and then to the top line of the next picture frame to two or three lines from the top of the sub-title text, for a total of 310 lines. It is at this moment that background band forming circuit 27 receives the signal to start producing a background band signal. This signal when mixed with the sub-title signal in mixer 32 provides a contrasting background to the sub-title print when viewed on a receiver screen. Circuit 27 will be explained further hereinafter.

In order to control the vertical length of the background band 11 i.e., the time during which band forming circuit 27 operates it is necessary to determine the vertical size of the sub-title print and that of section 14 of band 11. To this effect a band height control means 25 is inserted in the circuit between counter 23 and background band forming circuit 27. The function of band height control means 25 is to lock in background band forming circuit 27 during reception of sub-title information at line 16, and upon termination thereof to maintain background band forming circuit 27 operative for a time corresponding to the number of sweep lines corresponding to distance 14 (FIG. 1) of the background band 11. Accordingly, band height control means 25 maintains background band forming circuit 27 in operation as long as sub-title signals are sensed by sub-title detector 17, and thereafter band height control means 25 is adapted to count a rather small number of lines, such as two or three, to cause the background band to extend below the sub-title print on the receiver screen.

In order to inform band height control means 25 of the duration of sub-title information coming in from line 16, a line 18–19–33 couples to outout of sub-title detector 17 to an input of band height control means 25. The arrangement is such that during transmission of sub-title information line 18–19–33 maintains a bias voltage upon the associated input of band height control means 25. As soon as the sub-title signal ends this bias potential disappears and band height control means 25 starts counting the required number of lines for covering the distance indicated at 14 in FIG. 1. Thereafter background band forming circuit 27 is released and the rest of the picture exposes the bottom part of the image.

It will be evident from the above, that the operation described will be continuously repeated for each successive picture frame. Then assuming that the broadcasting system comprises fifty simple frames per second the counter 23 will be started once for each simple picture frame, i.e., fifty times a second and on each occasion will count 310 lines (assuming that the transmission incorporates 625 lines for two simple frames), and upon termination of this counting procedure counter 23 will transmit a signal to background band forming circuit 27 via line 24, band height control means 25 and line 26. As mentioned hereinbefore band height control means 25 operates to maintain a lock-in signal at an input of background band forming circuit 27 through line 26 for maintaining the band forming circuit 27 in operative condition during transmission of sub-title information, and thereafter for a period of time corresponding to the distance 14 on band 11 of FIG. 1. In this manner the total vertical distance of background band 11 will be dependent exclusively upon the duration of the sub-title transmission, i.e. the height of the letters of the sub-title printing, and the position of the band will also be determined exclusively by the position of the sub-title printing in the vertical direction of screen 10.

Background band forming circuit 27 may be of any suitable type. For example, it could be inserted between the picture video input line 30 and signal mixer 32 as indicated on FIG. 2, and arranged to either cut off the video signal or drive it into saturation such that as appearing on the screen the sweeping beam would produce a coherent band. As an example and assuming that the television system in use requires for white lines on the screen a voltage of 1 volt positive whereas for a black line the voltage level of the video input is 0 volt, with of course voltage levels between 0 and 1 volt for different shades of darkness, it would be sufficient to produce a dark band to combine the video input signal with a sufficiently negative bias voltage such that for maximum video input voltage level the resultant would be less than 0 volt, i.e. a completely dark sweep line. Hence in connection with the present example of 0 and +1 volt it would be sufficient to provide a bias voltage of −3 volts in order to obtain the above-noted desired results. Therefore the function of background band forming circuit 27 is to combine the video input signal from line 30 with a bias voltage of a few negative volts whenever a predetermined bias signal appears over input line 26. The output from background band forming circuit 27 is then applied to signal mixer 32 where it is combined with the sub-title signal emanating from amplifier 29, and the voltage levels are adjusted in a conventional manner so as to produce the desired picture with a dark ground band and text printed thereon.

In order to adequately deal with the situation where two lines of sub-titles must be presented simultaneously it is necessary to provide in the circuit thus far explained a further counter 40 which is generally similar to counter 23, and switching means 37, 21 and 38 whose function is to switch line 20 to the appropriate one of counters 23 and 40 depending on whether the line of text in question is the top one or the bottom one. Hence counter 40 works in tandem with counter 23 and shares the same band height control means 25. The operation of this arrangement will be described in detail hereinafter. It is important to mention at this stage that with the possibility of having two lines of sub-titles it is important to ensure that counter 23 is set into operation exclusively upon the appearance of the first line of text. The reason is that since the sub-title information received at line 16 is not necessarily synchronized with the frequency of picture image it could happen that on a given frame the sub-title information sensed by sub-title detector 17 relates to the second line of sub-title, and as a result counter 23 would be caused to start its counting operation by the second, bottom line of the sub-title text. The end result would be that on the following picture frame the dark ground band would not correspond with the position of the first line of the sub-title text.

For this reason it is necessary to introduce a synchronization between the sensing of sub-title information by sub-title detector 17 and the frequency of the picture frame such that detector 17 cannot start counter 23 into operation unless the sub-title signal is properly synchronized with the frequency of the picture frame. To this effect a vertical drive synchronization pulse emanating from line 34 is coupled with sub-title detector 17 and applies thereto a pulse whenever the sweeping beam reaches the bottom of the picture screen. Such vertical drive synchronization pulses are obviously synchronized with the picture frame frequency. The sub-title detector 17 in turn is arranged to produce a signal for starting operation of counter 23 and band height control means 25 only after a sub-title signal has been detected followed by a vertical drive synchronization pulse.

In this manner counter 23 can only be set into operation by the beginning of the sub-title signal in connection with the first line of sub-title text.

For producing two background bands such as when in the presence of two discrete sub-title text lines a line counter 35 coupled with a switching means 37 and a further counter 40 are provided as noted hereinbefore. Specifically, the circuit is arranged such that upon the occurrence of the first line of the sub-title text the output of sub-title detector 17 is applied to counter 23 via switch contact 21 and for the second line the switching means 37 switches over to contact 38 such that sub-title detector 17 is prepared to trigger counter 40 upon the occurrence of the second line of sub-title text. Line counter 35 is adapted to control the actuation of switch means 37. It is coupled with the output of sub-title detector 17 and is arranged to receive a signal therefrom upon the occurrence of the first line of sub-title. It is also adapted to count a number of picture lines representing the lower part of the dark ground band 14 plus approximately half the free space between it and the second background band. At that moment line counter 35 triggers switching means 37 which causes switch contact 21 to open and contact 28 to close. The arrangement is then ready to receive the second line of sub-title which will be detected by circuit 17 which in turn will set counter 40 into operation. Switching means 37, here represented symbolically as a relay, should preferably be an electronic switch on account of the relatively high frequency of operation.

The operation of the entire arrangement for two lines of text is as follows:

Upon the appearance of the first line of text over conductor 16, a signal produced by sub-title detector 17 is applied to counter 23 and simultaneously a signal is applied via line 18 to line counter 35 and shortly after termination of the signal for the first line, line counter 35 causes circuit 37 to switch its contact over to contact 38. When the signal on line 16 for the second line arrives at the input of sub-title detector 17, detector 17 similarly applies a triggering signal to counter 40 and upon termination of this sub-title signal line counter 35 causes circuit 37 to open circuit 38 and close contact 21. Both counters 23 and 40 are then in operation but counter 23 will terminate its counting of 310 lines in the present example before counter 40. Counter 23 will therefore trigger band height control means 25 and indirectly background band forming circuit 27 quite a few sweep lines before counter 40. In fact band height control means 25 will have time to turn off the background band forming circuit 27, therefore terminating the first background band before the second counter finishes its operation. A few sweep lines later counter 40 takes over to drive band height control means 25 into operation a second time which therefore initiates operation of background band forming circuit 27 for the production of the second background band. It should be noted that the same process takes place for each individual picture frame which means that each counter 23 and 40 begins a new counting cycle before termination of their respective background band. Stated differently and starting with the first picture frame it will be realized that the sub-title for the first frame will immediately appear superposed upon the video signal since the operation of detector 17, counter 23, band height control means 25 and background band forming circuit 27 will become effective for the following frame. This condition, however, lasts only one fiftieth of a second. On the second picture image the background band has been formed and counters 23 and 24 are actually preparing the circuit for the background band on the third picture image and so on.

Line counter 35 can advantageously be reset to 0, i.e., causing switching means 37 to revert to the position illustrated in FIG. 2 upon sensing of a vertical drive synchronization pulse from line 34.

It is also conceivable to arrange the line counter 35 to actuate switching means 37 upon the beginning of sub-title signal for the second line thereof. In this manner when the sub-title signal relates to only one line of text contact 21 will always remain closed, whereas in the presence of two lines of text switching means 37 would cause switch over from contact 21 to contact 38 and back to contact 21 for each single picture frame.

It will thus be evident from the above that with the arrangement that described that a dark band is formed for each text line. The text may contain only one line or may comprise two lines. The dark band is produced only slightly before the text is produced in each of said bands, represented by the distance 13. FIG. 1, which distance, has, in the example under consideration is equal to three lines. In addition the lower edge of the text in each of the text lines is located only slightly above the lower edge of the dark band, represented by the partial strip 14, FIG. 1.

If the text lines at the printing on the text dia-positives are fully horizontal, if the text positives are placed in the text dia-scanner in a fully correct position, and if, finally, all of the letters in the text are of the identical height and occupy the same vertical position in the text dia-positive, an acceptable result will be produced with the manual control mentioned previously. However, if for one reason or another either the text or the text dia-positive should be written in a more or less inclined position, or the text dia-positive placed into the text dia-scanner in a more or less inclined position, or, finally, if the letters should have different heights, the result produced may not be satisfactory. Thus, whereas these incongruities cannot be attended to or compensated for in a manual arrangement, the arrangement described hereinabove does provide automatic adjustment of the dark bands for the text in such a way that the text will in full, be positioned within a dark band.

In FIG. 1, the band 11 has been shown as being light or bright and the text 12 as being dark for purposes of clarity of illustration. In reality, of course, the band 11 is dark and the text 12 is bright, as mentioned above.

What is claimed is:

1. An electrical circuit arrangement for producing television video signals incorporating sub-titles which appear on the screen of a receiver as text on a contrasting background band, wherein a picture video signal is mixed with a sub-title information signal; comprising (a) a sub-title signal detector, coupled with the input line bearing said sub-title information signal, for determining the picture field lines that correspond with the arrival and termination of said sub-title information signal, (b) counting means, coupled with the output of said sub-title signal detector and triggered thereby immediately upon the arrival of a sub-title information signal, for counting a predetermined number of picture field lines substantially corresponding to the number of field lines that form a single picture, (c) a background band forming circuit for producing, responsive to the counting of said predetermined number of lines, a background band forming signal replacing said video signal, and (d) height control means, coupled with the output of said counting means and said sub-title detector, for starting and stopping operation of said background band forming circuit, respectively, upon termination of counting said predetermined number of picture field lines and upon, or shortly after, disappearance of said sub-title information signal.

2. A circuit arrangement as defined in claim 1 wherein said counting means is adjusted for counting a predetermined number of picture field lines which is slightly less than the total number of lines forming a single picture so that said background band forming signal is produced shortly before arrival of said sub-title information signal.

3. A circuit arrangement as defined in claim 2 wherein said height control means starts and stops operation of said background band forming circuit for every successive single picture so long as a sub-title information signal is sensed by said sub-title detector.

4. A circuit arrangement as defined in claim 3 wherein said height control means counts a number of lines which is slightly greater than the difference between the number of lines in a single picture and said predetermined number of lines.

5. A circuit arrangement as defined in claim 4 further comprising second counting means for counting a second predetermined number of picture lines upon the occurrence of the second one of two simultaneously transmitted sub-title text lines, said circuit means also comprising switching means for alternately switching the output circuit of said sub-title detector between the first-mentioned said counting means and said second counting means as one of said text lines terminates and the other begins.

6. A circuit arrangement as defined in claim 5 wherein said height control means is associated with both said counting means.

7. A circuit arrangement as defined in claim 6 further comprising line counting means coupled with the output of said sub-title detector for producing a pulse signal whenever one of said two text lines is detected by said sub-title detector, said pulse signals being applied to said switching means for operating same.

8. A circuit arrangement as defined in claim 7 comprising a source of reset pulses synchronized with the single picture frequency, said reset pulses being applied to said line counting means.

9. A circuit arrangement as defined in claim 8 wherein said reset pulses are applied to said sub-title detector.

References Cited

UNITED STATES PATENTS 3,465,097 9/1969 Brabon ------------- 178—5.6

ROBERT L. GRIFFIN, Primary Examiner

J. C. MARTIN, Assistant Examiner

U.S. Cl. X.R.

178—7.1, 7.2